(12) United States Patent
Jonnalagadda et al.

(10) Patent No.: US 12,188,142 B2
(45) Date of Patent: Jan. 7, 2025

(54) METHODS OF FORMING A STRENGTHENED COMPONENT

(71) Applicant: Unison Industries, LLC, Jacksonville, FL (US)

(72) Inventors: Dattu G V Jonnalagadda, Ponnur (IN); Sebastian Merin, Bangalore (IN); Balaraju Suresh, Bangalore (IN); Daniel Dyer, Dayton, OH (US); Gordon Tajiri, Allentown, PA (US); Yanzhe Yang, Mason, OH (US)

(73) Assignee: Unison Industries, LLC, Jacksonville, FL (US)

( * ) Notice: Subject to any disclaimer, the term of this patent is extended or adjusted under 35 U.S.C. 154(b) by 615 days.

(21) Appl. No.: 17/333,248

(22) Filed: May 28, 2021

(65) Prior Publication Data

US 2021/0285117 A1    Sep. 16, 2021

Related U.S. Application Data

(63) Continuation of application No. 15/581,627, filed on Apr. 28, 2017, now Pat. No. 11,021,802.

(51) Int. Cl.
| | | |
|---|---|---|
| *F01D 9/06* | (2006.01) | |
| *C25D 1/02* | (2006.01) | |
| *F02C 9/18* | (2006.01) | |

(52) U.S. Cl.
CPC ............ *C25D 1/02* (2013.01); *F01D 9/06* (2013.01); *F02C 9/18* (2013.01); *F05D 2220/323* (2013.01); *F05D 2230/30* (2013.01)

(58) Field of Classification Search
CPC ..... C25D 1/02; F01D 9/06; F02C 9/18; F05D 2220/323; F05D 2230/30
USPC ........................................................ 138/172
See application file for complete search history.

(56) References Cited

U.S. PATENT DOCUMENTS

| | | |
|---|---|---|
| 1,575,915 A | 3/1926 | Hart |
| 2,181,256 A | 11/1939 | Arbogast |
| 3,464,898 A | 9/1969 | Norris |
| 3,989,602 A | 11/1976 | McCandless |
| 5,945,166 A | 8/1999 | Singh et al. |
| 6,027,631 A | 2/2000 | Broadbent |
| 7,597,537 B2 | 10/2009 | Bucaro et al. |
| 8,966,762 B2 | 3/2015 | Soni |
| 9,128,468 B2 | 9/2015 | Grossenbacher et al. |
| 2001/0015043 A1 | 8/2001 | Brenneis et al. |
| 2007/0251825 A1 | 11/2007 | Kenney |

(Continued)

FOREIGN PATENT DOCUMENTS

| | | |
|---|---|---|
| DE | 2947247 A1 | 5/1981 |
| EP | 2182096 A1 | 5/2010 |

(Continued)

*Primary Examiner* — David R Deal
(74) *Attorney, Agent, or Firm* — McGarry Bair PC

(57) ABSTRACT

A strengthened component includes a sacrificial material mold of the component having an outer surface, an insert having an inner surface and an outer surface opposite and spaced from the inner surface such that the strengthening insert inner surface abuts the mold outer surface, and a metallic layer deposited over the exposed mold outer surface and the exposed strengthening insert outer surface, where the sacrificial material mold is removed from the strengthened component.

17 Claims, 8 Drawing Sheets

(56) References Cited

U.S. PATENT DOCUMENTS

| | | | |
|---|---|---|---|
| 2013/0199934 A1* | 8/2013 | Parkos, Jr. | C25D 1/00 205/76 |
| 2014/0159927 A1* | 6/2014 | Russell-Clarke | G06F 3/0202 29/527.1 |
| 2014/0202170 A1 | 7/2014 | Cook, III | |
| 2015/0063903 A1 | 3/2015 | Matthews et al. | |
| 2016/0003157 A1 | 1/2016 | Ott et al. | |
| 2016/0017509 A1 | 1/2016 | Agustoni | |
| 2016/0108814 A1 | 4/2016 | Schmitz | |
| 2019/0024251 A1* | 1/2019 | Li | B23P 15/02 |
| 2020/0011455 A1* | 1/2020 | Jonnalagadda | F16L 9/19 |

FOREIGN PATENT DOCUMENTS

| | | | |
|---|---|---|---|
| GB | 1213821 A | 11/1970 | |
| GB | 2094350 A1 | 9/1982 | |
| JP | S5257038 A | 5/1977 | |
| JP | H02135795 A | 5/1990 | |
| JP | H0890561 A | 4/1996 | |
| WO | 2015042089 A1 | 3/2015 | |

\* cited by examiner

METHODS OF FORMING A STRENGTHENED COMPONENT

CROSS-REFERENCE TO RELATED APPLICATIONS

The present application is a continuation of U.S. patent application Ser. No. 15/581,627, filed on Apr. 28, 2017, now U.S. Pat. No. 11,021,802, issued Jun. 1, 2021, which is hereby incorporated by reference in its entirety.

BACKGROUND OF THE INVENTION

Contemporary engines used in aircraft can include fluid passageways for providing flow from a fluid source to a fluid destination. In one non-limiting example, a bleed air system can receive pressurized bleed air from a compressor section of an engine and convey to a fluidly downstream component or system, such as an environmental control system. Additional fluid passageways can be utilized for carrying, transferring, or otherwise flowing fluid including, but not limited to, oil, coolant, water, fuel, or the like. In the example of an aircraft engine, the passageways can be exposed to high pressures, high temperatures, stresses, vibrations, thermal cycling, and the like. The passageway, or other component formed in a similar process, can be configured, designed, or arranged to provide reliable operation in the functional environment.

BRIEF DESCRIPTION OF THE INVENTION

In one aspect, the disclosure relates to an electroformed component, including a removable base having a first outer surface, a strengthening insert having a first inner surface and a second outer surface opposite and spaced from the first inner surface, the first inner surface abutting the first outer surface, and an electroformed metallic layer having a second inner surface and a third outer surface opposite and spaced from the second inner surface, the second inner surface abutting the second outer surface and at least a portion of the first outer surface, wherein the electroformed metallic layer entirely covers and is fixed to the second outer surface, and wherein the removable base is removed to define the electroformed component.

In another aspect, a strengthened component, comprising a mold of the component having an outer surface, wherein the mold comprises a sacrificial material, a strengthening insert having an inner surface and an outer surface, the outer surface opposite and spaced from the inner surface, and the strengthening insert positioned such that the inner surface abuts the mold outer surface, and a metallic layer, wherein the mold is removed after the metallic layer is formed to define the strengthened component.

In yet another aspect, a fluid conduit for an aircraft bleed air system comprising: a removable sacrificial material provided as a mold of the fluid conduit, the removable sacrificial material having a mold outer surface, a strengthening metallic insert disposed relative to the mold covering at least a portion of a high stress area pre-identified to experience higher stress during aircraft operations, as compared with non-high-stress areas, wherein the strengthening metallic insert defines an inner surface and an outer surface, the outer surface opposite and spaced from the inner surface, and wherein a distance between the inner surface and the outer surface defines a first thickness, and wherein the strengthening insert inner surface abuts the mold outer surface, and an electroformed metallic layer disposed over the mold outer surface, the electroformed metallic layer entirely covering and fixed to the strengthening insert outer surface, and the electroformed metallic layer defining a second thickness, wherein the second thickness is less than the first thickness, and wherein the removable sacrificial material is removed to define the fluid conduit.

DESCRIPTION OF EMBODIMENTS OF THE INVENTION

Figure 1:
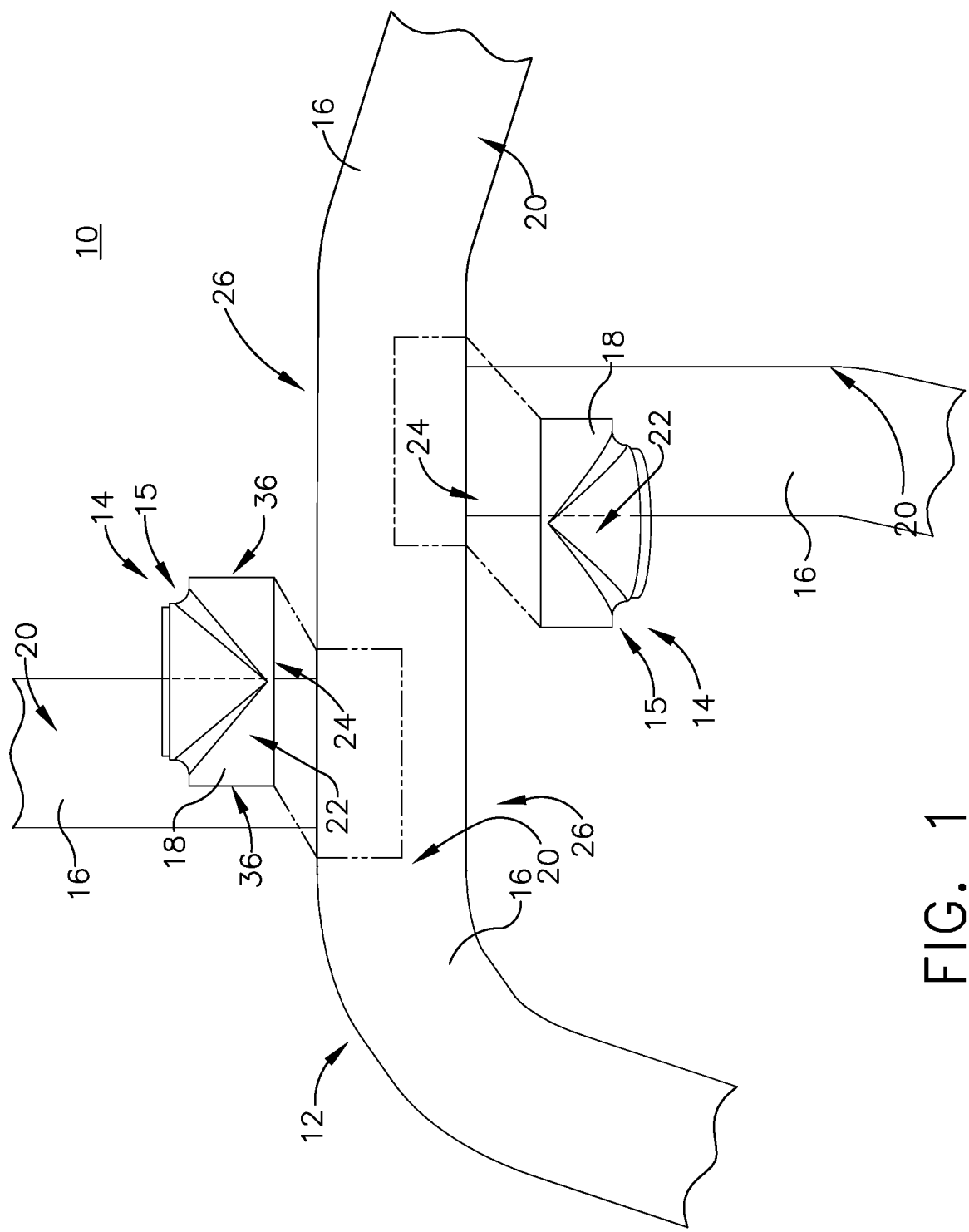
FIG. 1 is an exploded perspective view of a molding and a strengthening insert for a component of a partially-formed fluid conduit, in accordance with various aspects described herein.

In specialized environments or installations, components, walls, conduits, passageways, or the like can be configured, arranged, tailored or selected based on particular requirements. Non-limiting aspects for particular requirements can include geometric configuration, space or volume considerations, weight considerations, or operational environment considerations. Non-limiting aspects of operational environment considerations can further include temperature, altitude, pressure, vibrations, thermal cycling, or the like.

In one non-limiting example of a specialized application, a set of fluid conduits can be tailored for use in a bleed air system for an aircraft. The bleed air system can, for instance, supply or provide a passageway for airflow from an engine, a turbine, or from the environment external to the aircraft, to a downstream element. Non-limiting examples of the downstream element can utilize the airflow for heating, cooling, or pressurizing an element, system, or otherwise airflow-utilizing component. Bleed air system fluid conduits can further be exposed to operational environment considerations, such as those described herein.

While aspects of the disclosure are described with reference to enclosed fluid conduits for a bleed air system of an aircraft, aspects of the disclosure can be implemented in any component, walls, conduits, passageways, or the like, regardless of environment or installation location. It will be understood that the present disclosure can have general applicability in non-aircraft applications, such as other mobile applications and non-mobile industrial, commercial, and residential applications as well.

While "a set of" various elements will be described, it will be understood that "a set" can include any number of the respective elements, including only one element. The use of the terms "proximal" or "proximally," either by themselves or in conjunction with other terms or elements, refers to a component being relatively closer to a reference point or element compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "joint" can refer to any connection or coupling between proximate components, including, but not limited to, the connection of components in line with one another, or at a relative angle to one another. Also as used herein, "sacrificial" can refer to an element, component, or material composition that can be removed. Non-limiting examples of "sacrificial" elements can include a meltable composition such as wax or plastic, or a dissolvable composition. In this sense, the "sacrificial" element can be removed by way of melting when exposed to a heating element, or dissolved when exposed to a dissolving composition. Additional or alternative non-limiting aspects of sacrificial element removal can be included, such as mechanical disassembly, or physically removing elements or sub-elements. The exemplary drawings are for purposes of illustration only and the dimensions, positions, order and relative sizes reflected in the drawings attached hereto can vary.

FIG. 1 illustrates a perspective view of a partially-formed fluid conduit assembly 10. The partially-formed fluid conduit assembly 10 can include a set of discrete or continuous conduit molds 12 including a set or series of sacrificial or molded elements 16 arranged, configured, assembled, or the like, in a form or shape of a desired configuration, such as a portion of a bleed air system fluid conduit. The sacrificial elements 16 can include an outer surface 20. At least a subset of the sacrificial elements 16 can be molded to at least partially form a component 14, such as a wall, a housing, or a desired joining location between connected elements, such as a joint, illustrated as T-joints 15, or T-joint assemblies. As used herein, a "T-joint" denotes the "T" shaped configuration of adjoining arms, passages, conduits, or segments of the conduit molds 12 or partially-formed fluid conduit assembly 10.

Aspects of the partially-formed fluid conduit assembly 10, component 14, or T-joint 15 can also include a strengthening insert 18 having an inner surface 24, and an outer surface 22 opposite and spaced from the inner surface 24. Non-limiting aspects of the strengthening insert 18 can include a metallic composition, for example, to provide strength, rigidity, reliability, resilience, or the like. Non-limiting examples of strengthening insert 18 compositions can include, but are not limited to, nickel and nickel alloys, iron and iron alloys, aluminum, titanium, Inconel and Inconel alloys, of the like, or a combination thereof. In one non-limiting aspect, the increase in "strength" can be related to or associated with a corresponding increase in insert 18 material hardness. The strengthening insert 18 can be disposed, positioned, configured, or arranged relative to at least one of the sacrificial molded elements 16, the set of conduit molds 12, or the partially-formed fluid conduit assembly 10, component 14, or T-joint 15. In one non-limiting example, at least a portion of the inner surface 24 of the strengthening insert 18 can abut at least a portion of the outer surface 20 of the sacrificial element 16. The strengthening insert 18 can be contoured, shaped, keyed, configured, or the like, such that the entire inner surface 24 abuts the outer surface 20 of the sacrificial element 16. The strengthening insert 18 can include spaced or opposing insert ends 36. In the non-limiting examples, the insert ends 36 can include straight edges.

Aspects of the partially-formed fluid conduit assembly 10, component 14, or T-joint 15 can be included wherein the strengthening insert 18 can be disposed relative to, located, or arranged proximate to a pre-identified high stress area 26 of the partially-formed fluid conduit assembly 10, component 14, or T-joint 14.

The partially-formed fluid conduit assembly 10 of FIG. 1 can be covered, enveloped, or encased in a metallic layer by way of an electrodisposition process. As used herein, "electrodisposition" can include any process for building, forming, growing, or otherwise creating a metallic layer over another substrate or base. Non-limiting examples of electrodisposition can include electroforming, electroless forming, electroplating, or a combination thereof. While the remainder of the disclosure is directed to electroforming, any and all electrodisposition processes are equally applicable. In one non-limiting example of an electroforming process, the partially-formed fluid conduit assembly 10 of FIG. 1 can be submerged in an electrolytic liquid and electrically charged. The electric charge of the partially-formed fluid conduit assembly 10 can attract an oppositely charged electroforming material through the electrolytic solution. The attraction of the electroforming material to the partially-formed fluid conduit assembly 10 ultimately deposits the electroforming material on the exposed surfaces of the partially-formed fluid conduit assembly 10, creating an external metallic layer. Thus, the electroforming process can be utilized to form at least a portion of the component 14, the T-joint 15, the high stress area 26, of the partially-formed fluid conduit assembly 10 by way of a metallic layer over the exposed outer surface 20 of the set of sacrificial elements 16, the outer surface 22 of the strengthening element 18, or a combination thereof.

In one non-limiting example, electroforming material can include nickel and nickel alloys, iron and iron alloys, aluminum, titanium, Inconel and Inconel alloys, or the like, or a combination thereof. In another non-limiting example, at least a portion of the exposed surfaces 20, 22 of the partially-formed fluid conduit assembly 10 can include a metalized layer prior to the electroforming process.

Figure 2:
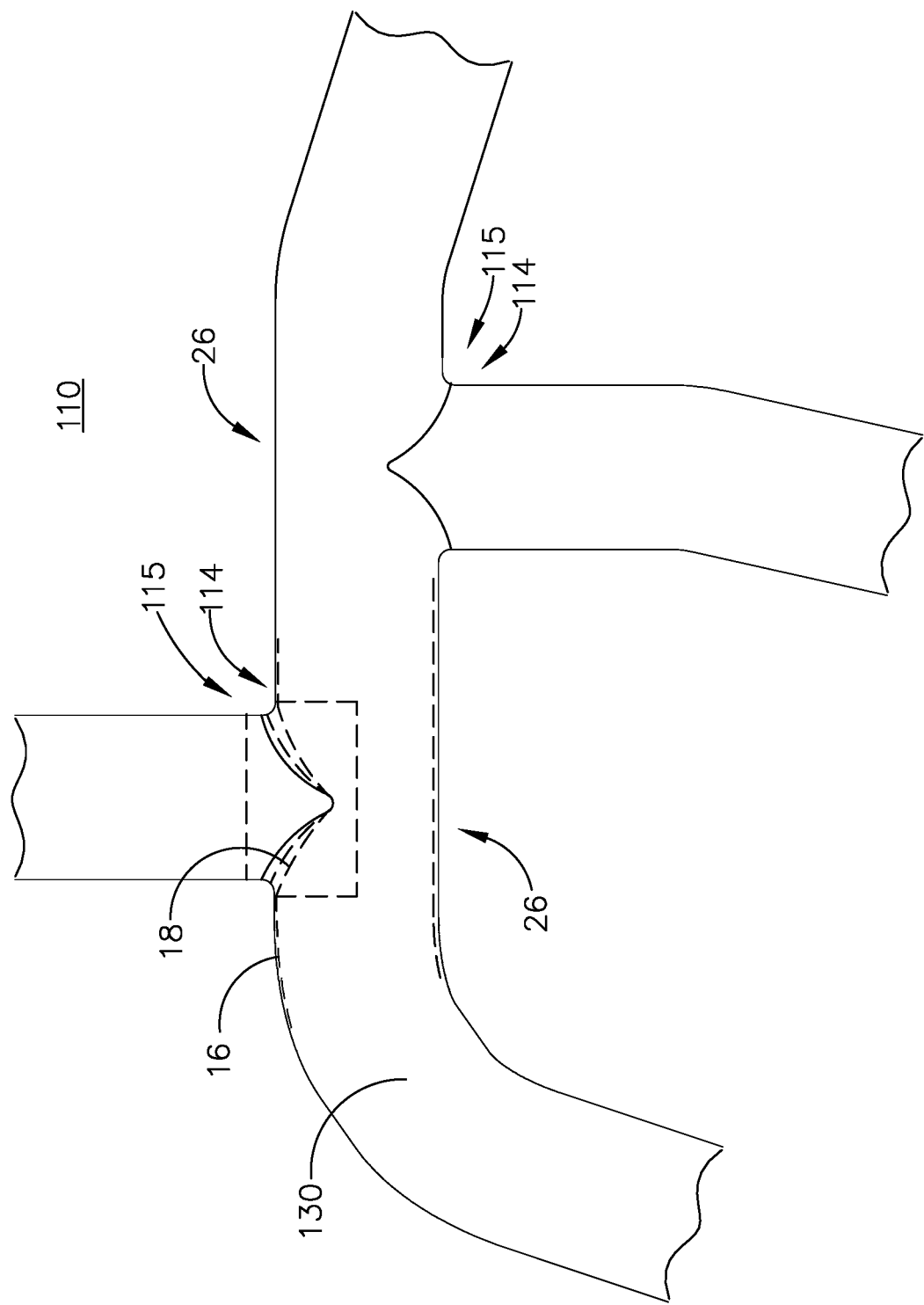
FIG. 2 is a perspective view of a strengthened component of the partially-formed fluid conduit of FIG. 1, with dotted schematic outline of the strengthening insert, in accordance with various aspects described herein.

FIG. 2 illustrates a partially-formed fluid conduit assembly 110, component 114, or T-joint 115 having an electroformed metallic layer 130 according to another aspect of the present disclosure. The partially-formed fluid conduit assembly 110 is similar to the partially-formed fluid conduit assembly 10; therefore, like parts will be identified with like numerals increased by 100, with it being understood that the description of the like parts of the partially-formed fluid conduit assembly 10 applies to the partially-formed fluid conduit assembly 110, unless otherwise noted. One difference is that the electroformed metallic layer 130 can include at least a portion of the "forming" of the partially-formed fluid conduit assembly 110. FIG. 2 further illustrates in dotted outline, aspects of the sacrificial element 16 and the strengthening insert 18, for ease of understanding. As shown, at least the strengthening insert 18 can be fixed relative to the partially-formed fluid conduit assembly 110, the high stress area 26, the component 114 or the T-joint 115 or electroformed metallic layer 130, by way of the electroforming process.

Figure 3:
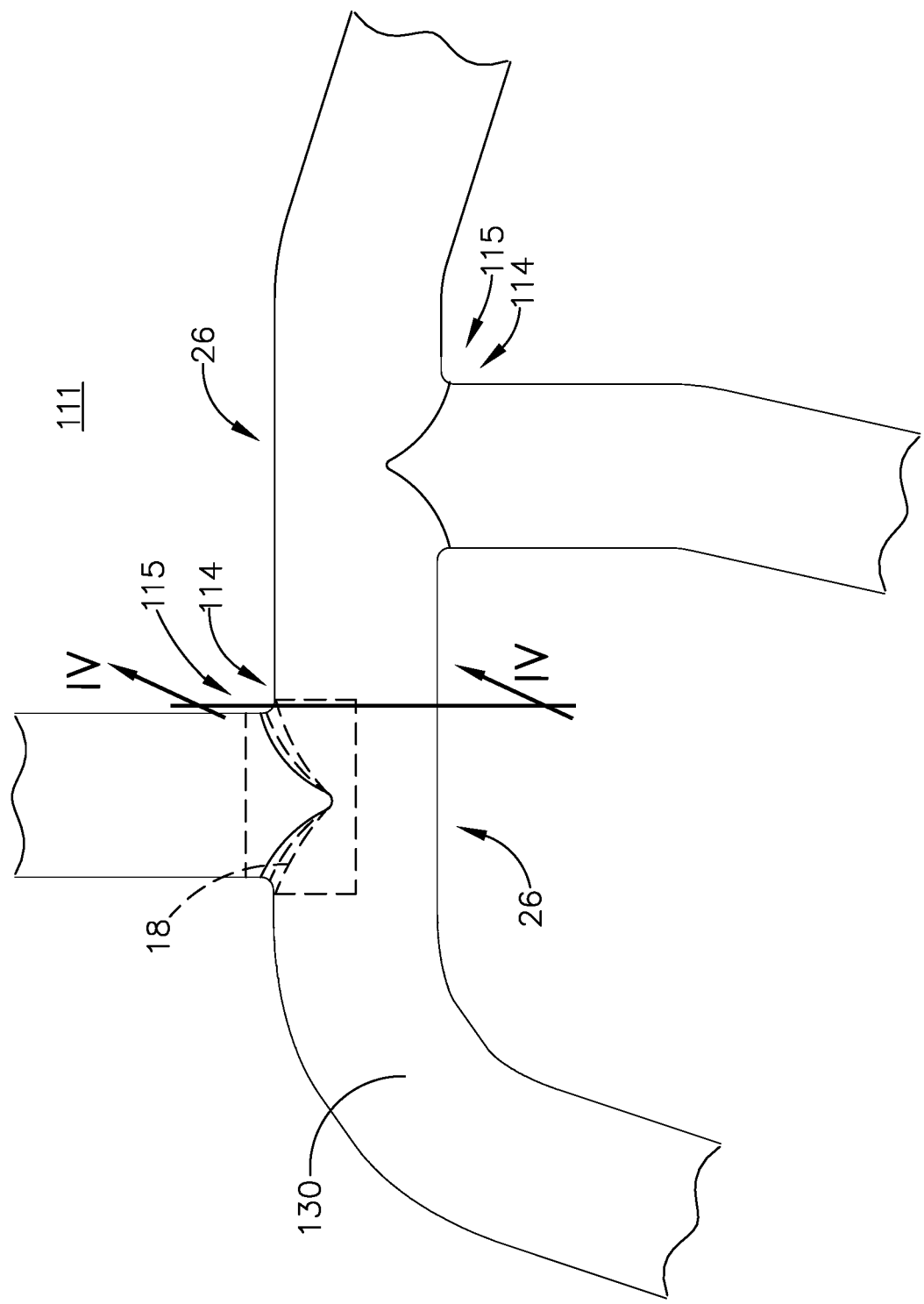
FIG. 3 is a perspective view of a strengthened component of a fully-formed fluid conduit, with dotted schematic outline of the strengthening insert, in accordance with various aspects described herein.

FIG. 3 illustrates a fully-formed fluid conduit assembly 111 (hereafter, "the fluid conduit assembly"), and dotted outline of the strengthening insert 18. After the forming of the fluid conduit assembly 111, as described herein, the set of sacrificial elements 16, can be "sacrificed" or removed, as described above. Thus, aspects of the fluid conduit assembly 111 can include only the strengthening insert 18 and the electroformed metallic layer 130.

Figure 4:
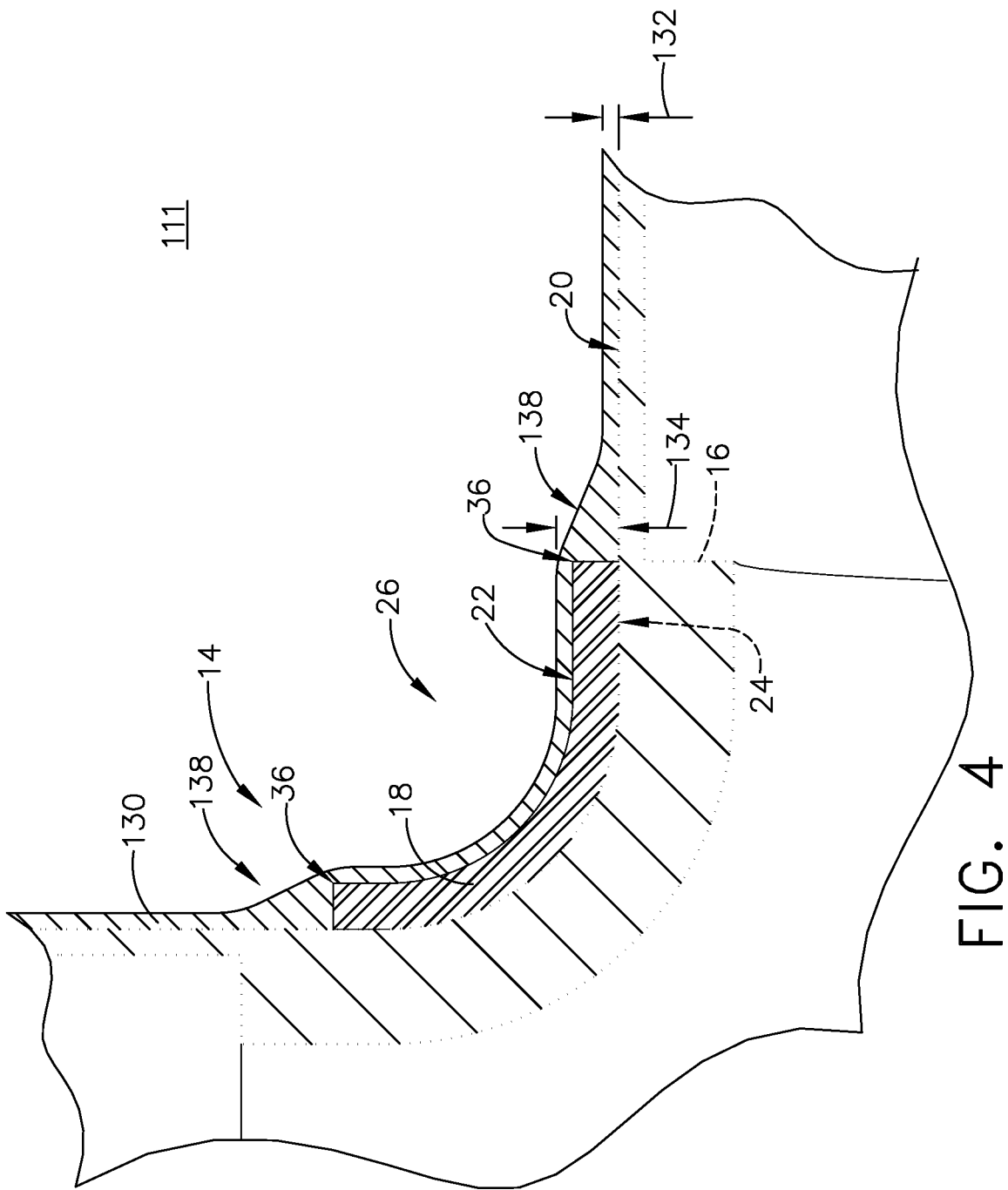
FIG. 4 is a schematic cross-sectional view of the strengthened component, taken along line IV-IV of FIG. 3, in accordance with various aspects described herein.

FIG. 4 illustrates a schematic cross section of the high stress area 26 of FIG. 3. As used herein, a "high stress area" 26 can refer to an area, an interface, a joint 14 between elements, or a portion of the partially-formed fluid conduit assembly 10 expected, designed, or intended to experience higher stress compared with non-high-stress portions of the partially-formed fluid conduit assembly 10. For instance, the high stress area 26 can be a result of the geometric configuration of the partially-formed fluid conduit assembly 10, or connections thereto. Non-limiting examples of stress can include vibration, torque, pressure, thermal cycling, or the like, and can be based at least partially on an operating environment of the partially-formed fluid conduit assembly 10. The stress can affect the high stress area 26, the joint 14, or the partially-formed fluid conduit assembly 10, resulting in, for example, component failure, fatigue, deformation, damage, or the like. The stress can affect the high stress area 26 instantaneously during fluid conduit assembly 10 operations, or over an elongated period of time. In this sense, a "high stress area" 26 can include a position or location that can to fail due to stresses experienced. Aspects of the disclosure can be included wherein the disposing of the strengthening insert 18 proximate or relative to the high stress area 26 can provide structural support or integrity to counter the stresses experienced at the high stress area 26. Stated another way, the strengthening insert 18 enables, provides for, or allows the fluid conduit assembly 10 or joint 14 to be better suited to resist failure at the high stress area 26 or at the joint 14.

As shown, the electroforming process can be selected, controlled, selected, or the like, to ensure at least a minimal electroformed material thickness 132 over each exposed surface 20, 22 of the partially-formed fluid conduit assembly 10. One non-limiting example minimal electroformed material thickness 132 is 0.40 millimeters. Also as shown, the electroformed material thickness 132 can be less than the strengthening insert thickness 134. In this sense, the primary structural support at the high stress area 26 can be provided by the strengthening insert 18, as opposed to the electroformed metallic layer 130, which the electroformed metallic layer 130 can provide the primary structural support for the non-high-stress areas. Thus, non-limiting aspects of the disclosure can be included wherein the electroforming material, or the electroformed material thickness 132 is selected based on desired operating aspects of the fluid conduit assembly 111, including but not limited to, pressure, fluid type, fluid temperature, the like, or a combination thereof. Likewise, non-limiting aspects of the disclosure can be included wherein the strengthening insert 18 or strengthening insert thickness 134 can be selected based on the same electroformed material considerations or the expected stresses described herein, or a combination thereof.

The use of the straight edge interface of the insert ends 36 can, in some instances, result in a higher current density during the electroforming process, producing a greater electroformed metallic layer thickness area 138 proximate to the insert ends 36. Thus, aspects of the disclosure can be included wherein the insert ends 36 can be configured, selected, or the like, to include beveled, blended, or radial insert edges 36 configured or selected to ensure a uniform expected electroformed metallic layer 130 across all surfaces 20, 22 of the fluid conduit assembly 111, component 14, or T-joint 15.

Figure 5:
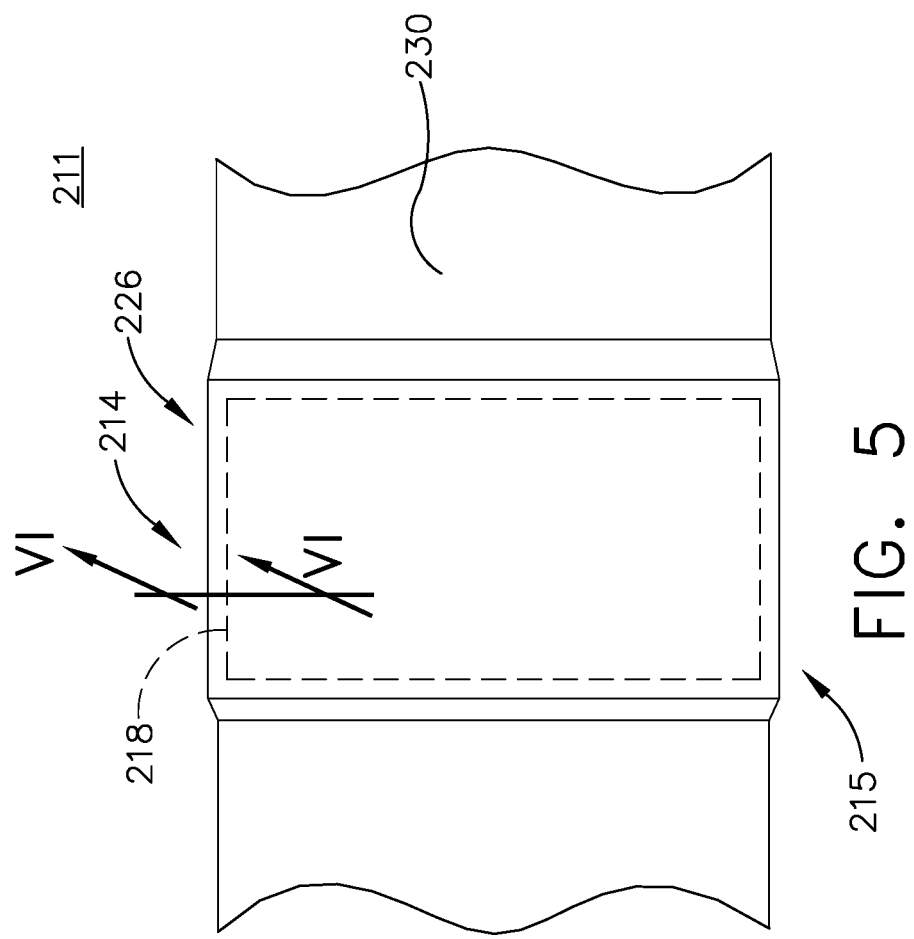
FIG. 5 is a perspective view of another strengthened component in the form of a straight pipe, with dotted schematic outline of the strengthening insert, in accordance with various aspects described herein.

FIG. 5 illustrates another fluid conduit assembly 211 according to another aspect of the present disclosure. The fluid conduit assembly 210 is similar to the fluid conduit assembly 111; therefore, like parts will be identified with like numerals increased by 200, with it being understood that the description of the like parts of the partially-formed fluid conduit assembly 111 applies to the fluid conduit assembly 211, unless otherwise noted. One difference is that the fluid conduit assembly 211 includes a component 214 in the form of a straight pipe wall 215. As schematically illustrated in dotted outline beneath the electroformed metallic layer 230, the strengthening insert 218 can comprise at least a partial ring or cylinder, or at least a partial ring or cylinder.

Figure 6:
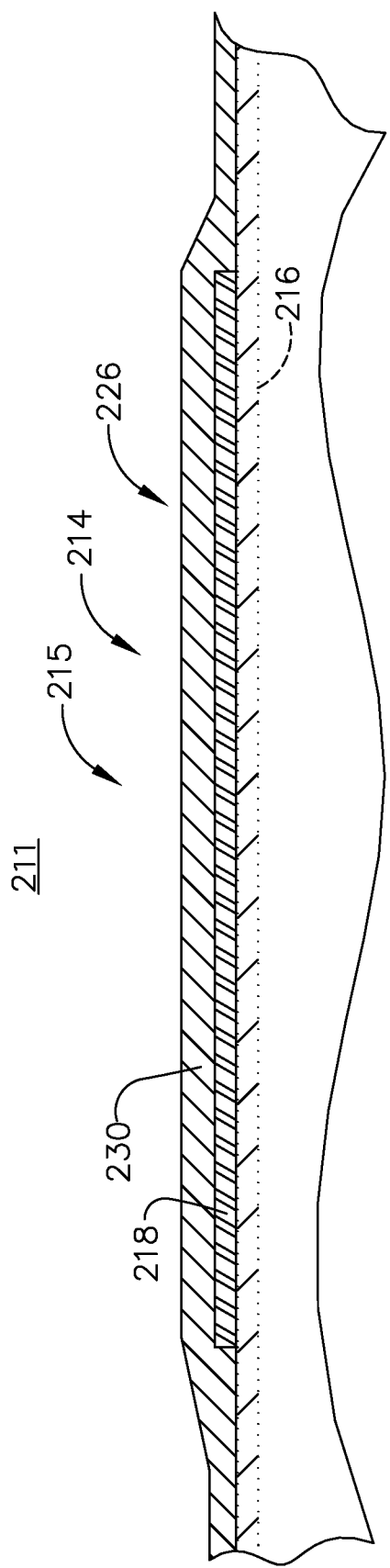
FIG. 6 is a schematic cross-sectional view of the strengthened component, taken along line VI-VI of FIG. 5, in accordance with various aspects described herein.

FIG. 6 illustrates a schematic cross section of the high stress area 26 of FIG. 5, included a dotted outline of the sacrificial material 216, for understanding. It will be understood that such sacrificial material 216 is removed prior to use of the component 214 having the strengthening insert 218.

Figure 7:
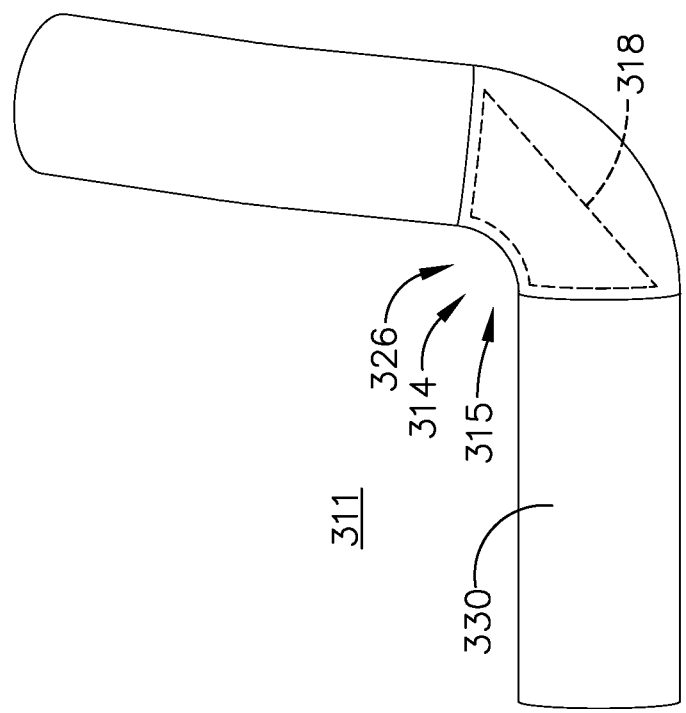
FIG. 7 is a perspective view of another strengthened component in the form of an elbow, with dotted schematic outline of the strengthening insert, in accordance with various aspects described herein.

FIG. 7 illustrates another fluid conduit assembly 311 according to another aspect of the present disclosure. The fluid conduit assembly 311 is similar to the fluid conduit assembly 111, 211; therefore, like parts will be identified with like numerals increased by 300, with it being understood that the description of the like parts of the partially-formed fluid conduit assembly 111, 211 applies to the fluid conduit assembly 311, unless otherwise noted. One difference is that the fluid conduit assembly 311 includes a component 314 in the form of an elbow 315 or elbow joint. As schematically illustrated in dotted outline beneath the electroformed metallic layer 330, the strengthening insert 318 can be positioned or configured to prevent extending or buckling of the joint 314.

Figure 8:
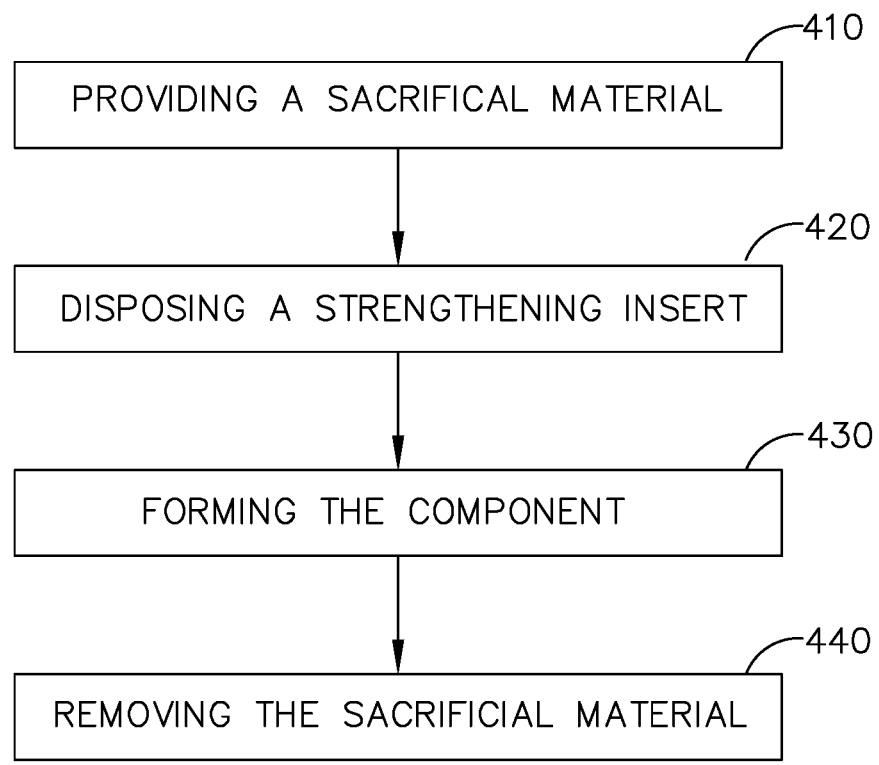
FIG. 8 is an example a flow chart diagram of demonstrating a method of for cooling a heat-generating module in accordance with various aspects described herein.

FIG. 8 illustrates a flow chart demonstrating a method 400 of forming a strengthened component 214, 314 or assembly 111, 211, 311. The method 400 begins by forming or providing a sacrificial material 16, 216, 316 into a mold of the component 14, 214, 314 having an outer surface 20 at 410. Next, the method 400 continues by disposing a strengthening insert 18, 218, 318 having an inner surface 24 and an outer surface 22 opposite and spaced from the inner surface 24 such that the strengthening insert 18, 218, 318 inner surface 24 abuts the outer surface 20 of the sacrificial material 16, 216, 316, at 420. The method 400 then proceeds to forming the component 214, 314 by way of electrodisposition of a metallic layer 130, 230, 330 over the exposed sacrificial material 16, 216, 316 outer surface 20 and the exposed strengthening insert 18, 218, 318 outer surface 22, at 430. Finally, the method 400 includes removing the sacrificial material 16, 216, 316 from the component 214, 314, as described herein, at 440.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can optionally include identifying a high stress area 26, 226, 326 prior to the disposing of the strengthening insert or disposing a strengthening insert having at least one of a beveled, blended, or radial insert edges. In another non-limiting example, the method 400 can include forming the component or conduit by way of a set or series of metallic layers. In yet another non-limiting example of the method 400 can include metalizing the exposed sacrificial material, the strengthening insert, or a combination thereof prior to the electrodisposition process.

Many other possible embodiments and configurations in addition to that shown in the above figures are contemplated by the present disclosure. For example, non-limiting aspects of the strengthened component, such as the strengthened joint or strengthened walls, can be implemented in any wall, or electrodisposited component to reduce the total weight of the component without compromising the structural strength. Aspects of the disclosure provide a method and apparatus forming a strengthened component, conduit, or joint. One advantage that can be realized is that the above described aspects have superior structural strength at critical joints or junctures, while reducing the total amount of electrodisposited materials or mass at non-critical areas of the element. A reduction in the total amount of electrodisposited materials or mass reduces the mass of the overall structure without compromising the integrity of the electrodisposited component. Another advantage over comparable elements or methods is that the above described aspects do not require brazing, welding, or doubling plates to reinforce or support the electroformed element, further reducing weight.

Yet another advantage of the above described aspects is by utilizing the electrodisposited processes described, a minimal thickness of the metallic layer for component integrity is predictable during forming, further ensuring or exceeding conduit integrity without adding unnecessary mass or bulk. Non-limiting aspects of the above described features can be utilized to reduce weight by an electrodisposited component by ten to fifteen percent. When designing aircraft components, important factors to address are size, weight, and reliability. The above described electrodisposited fluid conduit with strengthening insert results in a lower weight, smaller sized, increased performance, and increased integrity system. Reduced weight and size correlate to competitive advantages during flight.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electroformed component comprising:
   a strengthening insert having a first inner surface and a first strengthening insert outer surface opposite and spaced from the first inner surface by at least one end; and
   an electroformed metallic layer having a second inner surface and a second outer surface opposite and spaced from the second inner surface, the second inner surface abutting the first strengthening insert outer surface, wherein the electroformed metallic layer includes a first portion proximate the at least one end, wherein the first portion has an increased thickness compared to a second portion of the electroformed metallic layer, and wherein the electroformed metallic layer is configured to entirely cover and is fixed to the first strengthening insert outer surface.

2. The electroformed component of claim 1, further comprising a fluid passageway.

3. The electroformed component of claim 1, wherein the strengthening insert is located at a pre-identified high stress area.

4. The electroformed component of claim 1, wherein the second portion of the electroformed metallic layer has a first thickness, wherein the first thickness is less than a second thickness of the strengthening insert.

5. The electroformed component of claim 1, wherein the strengthening insert is metallic.

6. The electroformed component of claim 1, wherein at least a portion of the first strengthening insert outer surface is metalized before the electroformed metallic layer is formed.

7. A strengthened component, comprising:
   a strengthening insert having a first end, a second end, an inner surface and a strengthening insert outer surface, the strengthening insert outer surface opposite and spaced from the inner surface; and
   a metallic layer fixed to the strengthening insert outer surface and having a thickened portion adjacent at least one of the first end or the second end, the thickened portion defining an increased thickness compared to another portion of the metallic layer.

8. The strengthened component of claim 7, wherein the metallic layer entirely covers the strengthening insert outer surface.

9. The strengthened component of claim 7, wherein the strengthening insert is disposed at a pre-identified high stress area of the strengthened component.

10. The strengthened component of claim 7, wherein the strengthening insert is a metallic strengthening insert and wherein at least one of the first end or the second end of the strengthening insert includes at least one of a straight insert edge, a beveled insert edge, a blended insert edge, or a radial insert edge.

11. The strengthened component of claim 7, wherein the strengthened component comprises at least one of a conduit joint, straight pipe, or an elbow.

12. The strengthened component of claim 7, wherein the metallic layer further comprises portion having a first thickness, wherein the first thickness is less than a second thickness of the strengthening insert.

13. The strengthened component of claim 7, wherein the metallic layer is at least 0.40 millimeters thick over the strengthening insert outer surface.

14. The strengthened component of claim 7, wherein at least a portion of the outer surface of the strengthening insert is metalized.

15. A fluid conduit for an aircraft bleed air system comprising:
 a strengthening metallic insert positioned at a pre-identified high stress area, wherein the strengthening metallic insert defines an inner surface and a strengthening metallic insert outer surface, the strengthening metallic insert outer surface opposite and spaced from the inner surface, and wherein a distance between the inner surface and the strengthening metallic insert outer surface defines a first thickness; and
 an electroformed metallic layer entirely covering and fixed to the strengthening metallic insert outer surface, and the electroformed metallic layer having a first portion defining a second thickness, wherein the second thickness is less than the first thickness and the electroformed metallic layer having a second portion adjacent an end of the strengthening metallic insert and wherein the second portion has a third thickness, and wherein the second thickness is less than the third thickness.

16. The fluid conduit of claim 15, wherein the electroformed metallic layer is at least 0.40 millimeters thick.

17. The fluid conduit of claim 16, wherein at least a portion of the strengthening metallic insert outer surface includes a metalized layer.

* * * * *